United States Patent [19]

Chung

[11] Patent Number: 4,780,523
[45] Date of Patent: Oct. 25, 1988

[54] META-TETRAMETHYL XYLENE DIAMINE POLYURETHANE COMPOSITIONS AND PROCESS OF MAKING THE SAME

[75] Inventor: Daniel A. Chung, Dublin, Ohio

[73] Assignee: The Goodyear Tire & Rubber Company, Akron, Ohio

[21] Appl. No.: 26,401

[22] Filed: Mar. 2, 1987

[51] Int. Cl.$^4$ ............ C08G 18/30; C08G 18/38; C08G 18/42
[52] U.S. Cl. ............ 528/76; 528/64; 528/81; 528/83; 528/77; 528/839
[58] Field of Search ............ 528/64, 76, 81, 83, 528/77; 524/839

[56] References Cited

U.S. PATENT DOCUMENTS

| | | | |
|---|---|---|---|
| 4,374,210 | 2/1983 | Ewen et al. | 528/64 |
| 4,387,181 | 6/1983 | Brown et al. | 524/839 |
| 4,526,905 | 7/1985 | Lucast et al. | 528/76 |
| 4,554,299 | 11/1985 | Liggett | 528/64 |
| 4,554,308 | 11/1985 | Russiello | 524/839 |

FOREIGN PATENT DOCUMENTS 0036394 3/1979 Japan .

OTHER PUBLICATIONS

Arendt et al., Chemical Abstracts, 99:105737t, 1, (1983).
Saxon et al., Chemical Abstracts, 103:178958b, 24, (1985).
Logan et al., Chemical Abstracts, 98:161588m, 29, (1983).
Henderson et al., Chemical Abstracts, 104:207705v, 1, (6-1986).
Jasinski, Chemical Abstracts, 107:200063n, 79, (11-1987).
Morgan et al., Chemical Abstracts, 69:44528g, 4188, (1968).
E. I. du Pont De Nemours & Co., Chemical Abstracts, 66:46198m, 4373, (1967).
Morgan, Chemical Abstracts, 68:96752z, 9352-3, (1968).

*Primary Examiner*—Harold D. Anderson
*Assistant Examiner*—Dennis R. Daley
*Attorney, Agent, or Firm*—Alvin T. Rockhill; J. D. Wolfe

[57] ABSTRACT

A polyurethane essentially free of gel formed by reaction of a reactive hydrogen material such as the polyether glycol or polyester polyol or their mixtures, an organic polyisocyanate such as aliphatic or alicycloaliphatic ones and meta-tetramethyl xylene diamine useful for forming water dispersions, 100% solids castings or solvent casting of films or other polyurethane articles.

8 Claims, No Drawings

META-TETRAMETHYL XYLENE DIAMINE POLYURETHANE COMPOSITIONS AND PROCESS OF MAKING THE SAME

FIELD OF THE INVENTION

This invention relates to a method of making polyurethane compositions with meta-tetramethyl xylene diamine and to said compositions. More particularly, this invention relates to polyurethane compositions formed by reaction of reactive hydrogen containing material with an aliphatic or cycloaliphatic polyisocyanate and curing with meta-tetramethyl xylene diamine. A specific embodiment of this invention relates to water oil dispersions containing a phase containing a prepolymer and a phase containing meta-tetramethyl xylene diamine. A further embodiment relates to films and 100% solids castings and related shaped compositions. In another embodiment of this invention, films can be formed from organic solvent systems which do not contain ketones.

This invention supplies a polyurethane essentially free of gel particles composed of reaction product of a sterically hindered organic polyisocyanate, preferably an aliphatic or cycloaliphatic polyisocyanate, more preferably meta-tetramethyl xylene diisocyanate; a reactive hydrogen containing material of 500 to 10,000 and preferably about 1000 to 6000 molecular weight such as polyether glycol or polyester prepared from the phthalic or aliphatic diacids of 6 to 10 carbons such as azelaic acid and glycols containing from 2 to 10 carbon atoms with meta-tetramethyl xylene diamine.

Specific preferred polyesters are a water dispersion of an organic phase containing polyurethane prepolymer having about 0.5 to about 14 and preferably 3 to about 10% free NCO and a water phase containing a curative composed of meta-tetramethyl xylene diamine, said dispersion being stable for several hours under continuing agitation. It is desirable that the organic phase contains a water insoluble solvent, such as the hydrocarbons and the prepolymer is reaction product of a reactive hydrogen containing material of 500 to 10,000 and preferably 1000 to 6000 molecular weight of a polyether glycol or a polyester with an organic polyisocyanate such as the aliphatic and cycloaliphatic diisocyanates.

An organic solvent system containing no ketones or Schiff bases of low to very high solids can be used to coat substrates or to form films or coatings with polyurethane prepolymers where the curative is meta-tetramethyl xylene diamine as the gel time is relatively long, i.e. in excess of 0.5 minutes and preferably 1 to 20 minutes.

PRIOR ART

It is known that aliphatic diamines are extremely reactive toward all isocyanate terminated prepolymers. A mixture of an isocyanate terminated prepolymer and an aliphatic or a cycloaliphatic diamine usually gel before the components can be well mixed. Hence, it has been a practice to mix the aliphatic or cycloaliphatic diamine with ketone solvents to form Schiff bases to facilitate the reaction of the prepolymer and aliphatic or cycloaliphatic diamine without gelation and thus permit films to be made essentially free of gel.

Due to the gel problem, it has not been possible to make essentially a non-solvent castings, sometimes called 100% solids castings at elevated temperatures, if the formulation contains an aliphatic diamine. Consequently much effort has been devoted to developing 100% solids castings by using various feed systems on extruders.

SUMMARY OF INVENTION AND BEST MODES

I have discovered that meta-tetramethyl xylene diamine can be used to cure prepolymers without gelation to yield a 100% solids casting, and related useful articles, and to form films in water or non-Schiff base organic solvent systems. Meta-tetramethyl xylene diamine may be used either in one shot methods or prepolymer methods to make useful polyurethane articles. The versatility of meta-tetramethyl xylene diamine as a urethane curative can be illustrated by its use in three different systems as follows: (1) in high solids organic solvent system, meta-tetramethyl xylene diamine does not require the presence of at least a ketone, (2) it can be used in an aqueous solution to cure water dispersible polyurethane prepolymers such as those made in the conventional manner, and (3) it can be used to prepare 100% solids castings at elevated temperature, in the neighborhood of 95° C.

The nature of this invention and its advantages are further illustrated and exemplified by the following representative examples where all parts and percentages are by weight unless otherwise indicated.

EXAMPLE 1

A prepolymer prepared from a Hm I/Az liquid polyester and methylene bis(4-cyclohexylisocyanate) (Desomodur W) was dissolved in toluene. It was mixed with a 20% solution of meta-tetramethyl xylene diamine in toluene. No ketone was used in the formulation. The gel time of the mixture was two minutes, ample time for mixing by hand and drawing down films. The complete formulation 3744 and tensile/elongation property of the film are given in Table I.

EXAMPLE 2

Meta-tetramethyl xylene diamine is also miscible with water. It can be used to cure isocyanate terminated prepolymers which are dispersible in water, viz the conventional prepolymer emulsion. In this case, the curing reaction between the aliphatic diamine and the isocyanate was further delayed by the diffusion rate of the diamine into the prepolymer particles in the aqueous emulsion.

A liquid polyester containing the sodium salt of 5-sulfo isophthalic acid (SIPA) was synthesized, so that a water dispersible prepolymer was obtained when the liquid polyester was reacted with Desmodur W designated as recipe No 3829 in Table 2. Meta-tetramethyl xylene diamine in water was then added to the aqueous white emulsion of the prepolymer. The emulsion was stable for at least 24 hours, as long as it was under continuous agitation. A tack free film was obtained after the evaporation of water.

An organic solvent such as 1,4-dioxane or like solvents may be used as a cosolvent with water to form another emulsion. A film with excellent mechanical property was obtained as shown by recipe No 3831 in Table 2.

EXAMPLE 3

Generally, the use of aliphatic diamines is limited to solvent or water systems, so no solvent polyurethane castings involving aliphatic diamines remained a challenge to the polyurethane industry until this invention was made.

I discovered that a 100% solids castings was possible, using meta-tetramethyl xylene diamine to cure a prepolymer such as the one prepared from a sterically hindered diisocyanate such as meta-tetramethyl xylene diisocyanate, m-TMXDI.

Two prepolymers were prepared from meta-tetramethyl xylene diisocyanate using a liquid polyester and the polyether polyol known as polytetramethylene ether glycol, respectively (recipe numbers 3822 and 3814 in Table 3). Surprisingly long gel time (8 minutes) was observed when the polyether prepolymer was mixed with meta-tetramethyl xylene diamine at 95° C. The lower molecular weight liquid polyester formulation was also castable by hand mixing at 110° C. The pot life of the diamine/prepolymer mixture was 2 minutes. Postcuring of both films was performed at 125° C. for 17 hours. Low modulus elastomers with high elongation values at break were obtained from both prepolymers.

Thus meta-tetramethyl xylene diamine is usable in non-ketonic solvent or water as well as in nonsolvent casting systems. Usually about 0.5 to 1.1 mole of diamine per mole of excess organic polyisocyanate is used with the preferred range being about 0.8 to 0.95 moles per mole. The hindered diisocyanates of the formula

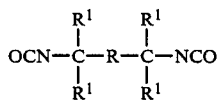

wherein R and $R^1$ are hydrocarbon radicals such as m-tetramethyl xylene diisocyanate or p-tetra methyl xylene diisocyanate are preferred and usually less than about 16 carbon atoms.

TABLE I

| m-TMXDA Cure Formulation in Organic Solvents PBW Basis | |
|---|---|
| | 3744 |
| Prepolymer | |
| Hm-I/Az* | 100.0 |
| Desmodur W, | 27.45 |
| Toluene | 72.7 |
| % NCO, in Toluene | 2.26 |
| Curative | |
| m-TMXDA | 9.50 |
| Toluene | 38.0 |
| Amine Level | 0.92 |
| Physical Property | |
| 100% Modulus, pascals | $5.17 \times 10^6$ |
| 300% Modulus, pascals | $1.86 \times 10^7$ |
| Ultimate Tensile, pascals | $4.27 \times 10^7$ |
| Ultimate Elongation, % | 410 |

*A polyester of 2000 molecular weight formed by esterification of a 50/50 mol per mol mixture of isophthalic acid or anhydride and azelaic acid with hexamethylene glycol.

TABLE 2

| m-TMXDA CURE FORMULATIONS IN AQUEOUS EMULSIONS PBW Basis | | |
|---|---|---|
| Recipe No | 3829 | 3831 |
| Prepolymer | | |
| DEG-I/Az/SIPA* | 100.0 | 100.0 |
| Desmodur W | 59.4 | 59.4 |
| % NCO (100% solids) | 6.1 | 6.1 |
| Water | 313.4 | 114.6 |
| 1,4 Dioxane | — | 134.8 |

TABLE 2-continued

| m-TMXDA CURE FORMULATIONS IN AQUEOUS EMULSIONS PBW Basis | | |
|---|---|---|
| Recipe No | 3829 | 3831 |
| Temperature of Emulsion, °C. | 58.0 | 47.0 |
| Curative | | |
| m-TMXDA | 20.2 | 20.2 |
| Water | 20.2 | 20.2 |
| Amine Level | 0.92 | 0.92 |
| % Solids | 35.0 | 40.0 |
| Physical Property | | |
| 100% Modulus, pascals | | $1.65 \times 10^7$ |
| 300% Modulus, pascals | | $2.76 \times 10^7$ |
| Ultimate Tensile, pascals | | $3.17 \times 10^7$ |
| Ultimate Elongation, % | | 350 |

*A polyester containing diethylene glycol esterification product of 22/70/8 mole percent of isophthalic acid, azelaic acid and sodium salt of 5-sulfo-isophthalic acid (SIPA), respectively.

TABLE 3

| m-TMXDA CURE FORMULATION IN 100% SOLIDS CASTINGS PWB Basis | | |
|---|---|---|
| Recipe No | 3822 | 3814 |
| Prepolymer | | |
| Hm-I/Az* | 100.0 | — |
| Terathane TM 2900** | — | 100.0 |
| Santowhite Powder Antioxidant | | 1.0 |
| m-TMXDI | 22.7 | 16.8 |
| % NCO | 3.2 | 2.3 |
| Curative | | |
| m-TMXDA | 8.43 | 5.89 |
| Amine Level | 0.94 | 0.94 |
| Physical Properties | | |
| 100% Modulus, pascals | $1.52 \times 10^6$ | $1.38 \times 10^6$ |
| 300% Modulus, pascals | $2.62 \times 10^6$ | $1.79 \times 10^6$ |
| 500% Modulus, pascals | $4.14 \times 10^6$ | $3.59 \times 10^6$ |
| Ultimate Tensile, pascals | $1.72 \times 10^7$ | $1.31 \times 10^7$ |
| Ultimate Elongation, % | 760 | 760 |
| Compression Load Deflection @ 75° F. | | |
| 10%, pascals | $8.27 \times 10^5$ | $3.93 \times 10^5$ |
| 20%, pascals | $1.49 \times 10^6$ | $7.58 \times 10^5$ |
| 30%, pascals | $2.34 \times 10^6$ | $1.38 \times 10^6$ |
| 40%, pascals | $3.58 \times 10^6$ | $2.34 \times 10^6$ |
| Shore A Hardness | 62 | 64 |

*A polyester of 2150 molecular weight formed by esterification of a 50/50 mole percent mixture of isophthalic acid and azelaic acid with hexamethylene glycol.
**Terathane TM 2900 is a polytetramethylene ether glycol of 2900 molecular weight.
M-TMXDI and m-TMXDA is the dissocyanate and diamine respectively of m-tetramethyl xylene.

While certain representative embodiments and details have been shown for the purpose of illustrating the invention, it will be apparent to those skilled in this art that various changes and modifications may be made therein without departing from the scope of the invention.

What is claimed is:

1. A polyurethane essentially free of gel particles composed of the reaction product of an organic polyisocyanate, a reactive hydrogen containing material and meta-tetramethyl xylene diamine.

2. The polyurethane of claim 1 wherein the reactive hydrogen containing material is selected from the class having a molecular weight of about 1000 to about 6000 consisting of a polyether glycol and a polyester polyol.

3. The polyurethane of claim 1 wherein the organic polyisocyanate is selected from the class consisting of an aliphatic diisocyanate and cycloaliphatic diisocyanate.

4. The polyurethane of claim 2 wherein the polyester polyol contains 2 to 3 hydroxyls.

5. A film essentially free of gel formed by coating a substrate with a mixture of an organic polyisocyanate, reactive hydrogen containing material and a meta-tetramethyl xylene diamine.

6. The film, of claim 5 wherein the mixture is dispersed in a hydrocarbon solvent and the coating on said substrate is dried to remove the solvent.

7. The polyurethane of claim 1 wherein the organic polyisocyanate is a hindered polyisocyanate of the formula

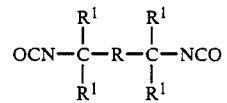

wherein R and $R^1$ are hydrocarbon radicals of less than about 16 carbon atoms.

8. The polyurethane of claim 7 wherein R and R' are selected from the group consisting of meta tetramethyl xylene diisocyanate and para-tetramethyl xylene diisocyanate.

* * * * *